E. R. CONVERSE.
WATER ELEVATOR.
APPLICATION FILED FEB. 7, 1908.
905,654.
Patented Dec. 1, 1908.
2 SHEETS—SHEET 1.
Fig. 1.
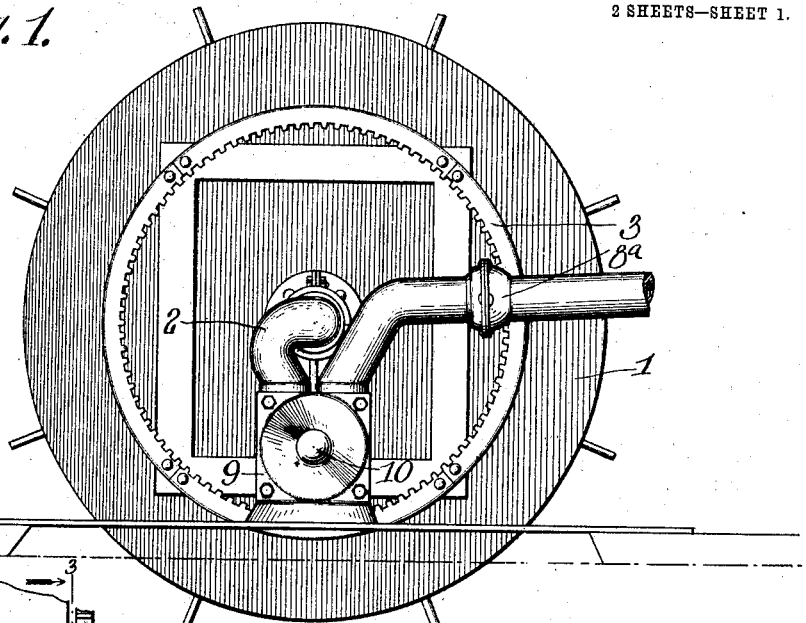
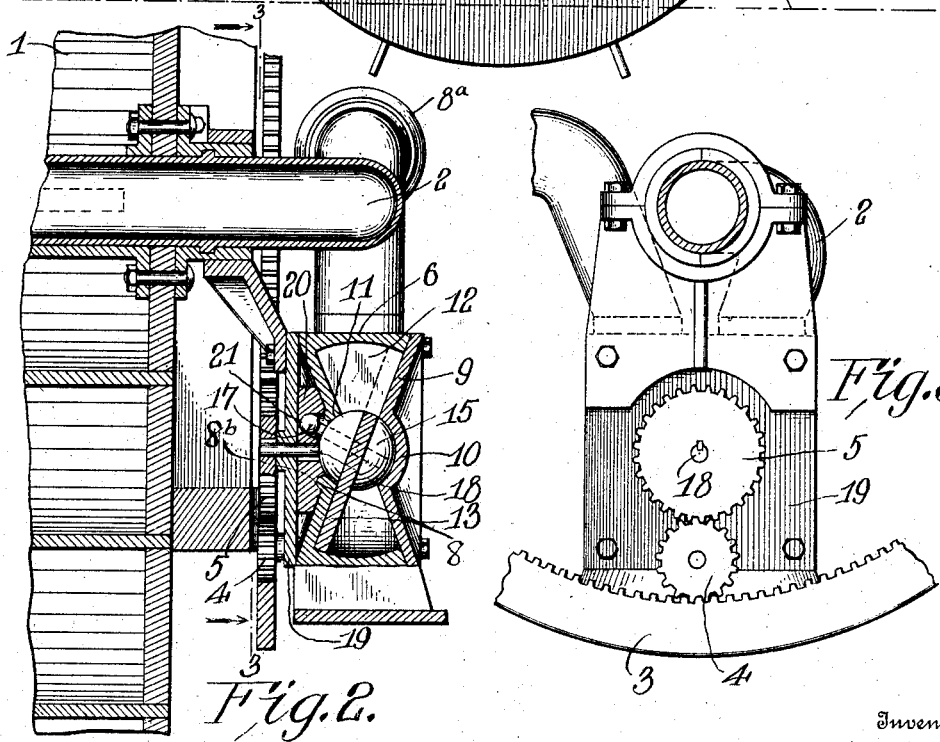
Fig. 2.
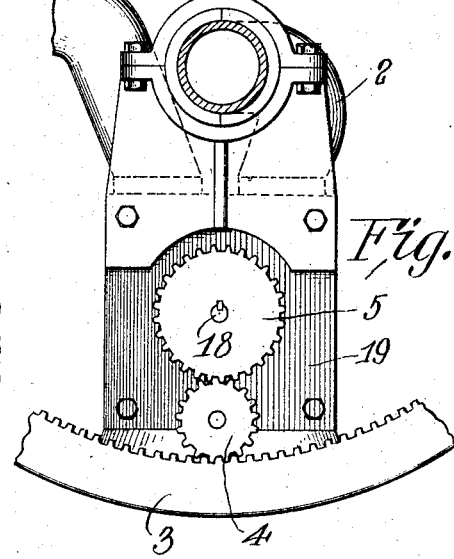
Fig. 3.
Witnesses
C. E. Smith.
R. C. Braddock.
Inventor
Edward R. Converse,
By William W. Deane,
his Attorney

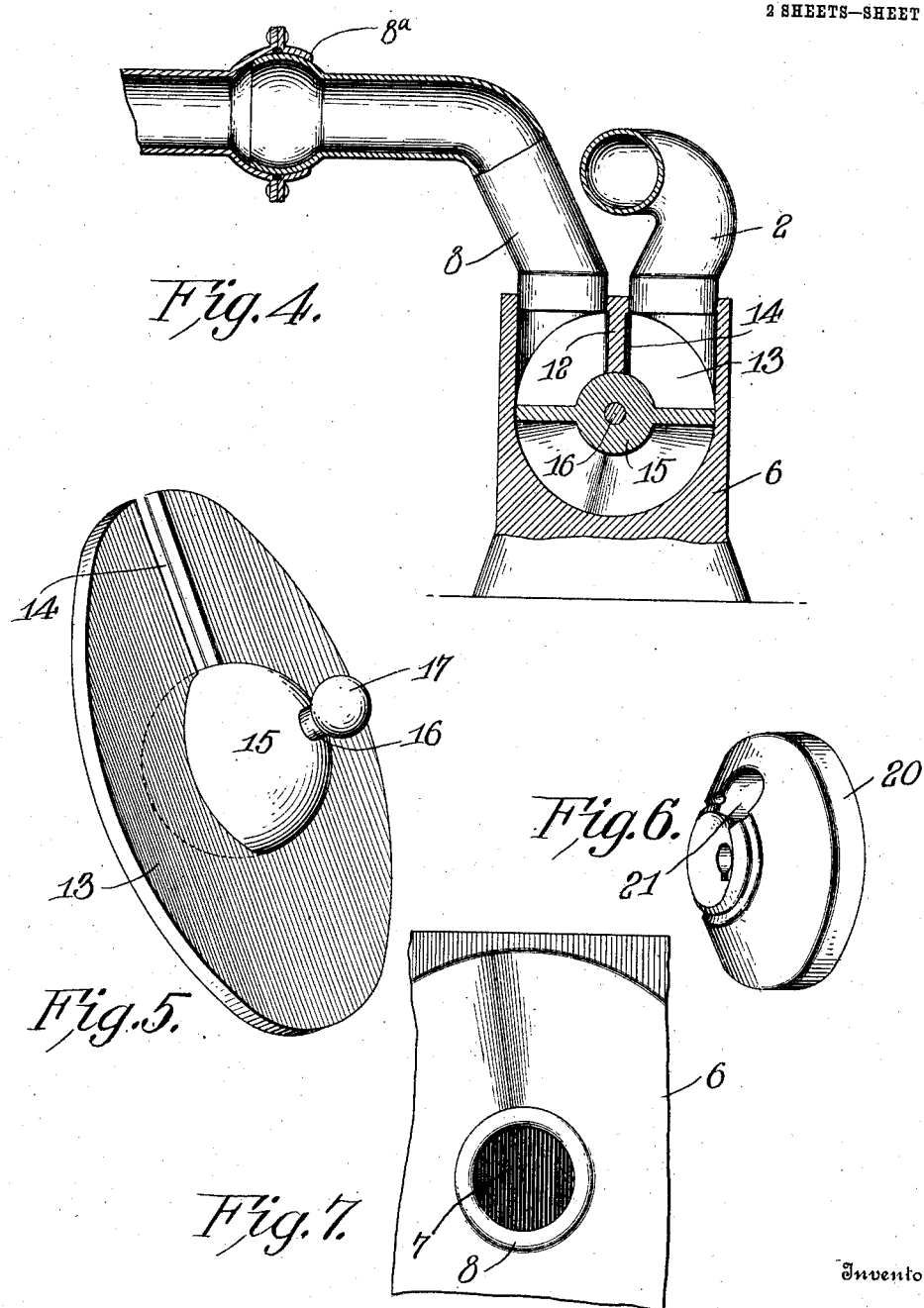

UNITED STATES PATENT OFFICE.

EDWARD R. CONVERSE, OF BASIN, WYOMING.

WATER-ELEVATOR.

No. 905,654.   Specification of Letters Patent.   Patented Dec. 1, 1908.

Application filed February 7, 1908. Serial No. 414,721.

*To all whom it may concern:*

Be it known that I, EDWARD R. CONVERSE, citizen of the United States, residing at Basin city, in the county of Bighorn and State of Wyoming, have invented certain new and useful Improvements in Water-Elevators, of which the following is a specification.

My invention has to do with the transfer of water from one point to another for irrigation and other purposes; and it seeks to provide simple, efficient and durable means for utilizing the current power of a stream to force the water thereof to a desired point of use.

To the attainment of the foregoing object, the invention will be fully understood from the following description and claims when the same are read in connection with the drawings, accompanying and forming part of this specification, in which:

Figure 1 is a side elevation of the apparatus constituting the best practical embodiment of my invention extant. Fig. 2 is a detail vertical section on an enlarged scale, taken at a right angle to Fig. 1. Fig. 3 is a detail section taken in the plane indicated by the line 3—3 of Fig. 2. Fig. 4 is a detail section taken through the pump in a vertical plane parallel to Fig. 3. Fig. 5 is an enlarged perspective view of the oscillatory piston of the pump comprised in my improvements. Fig. 6 is a perspective view of the crank disk for coöperating with the said piston. Fig. 7 is a detail side elevation of that side of the pump casing opposed to the said crank disk.

Similar numerals designate corresponding parts in all of the views of the drawings, referring to which:

1 is a wheel arranged to derive motion from a running stream of water, and to utilize such motion in raising water from the stream and supplying such water through a conduit 2 to the induction orifice of a pump casing hereinafter referred to in detail. The said wheel 1 may be of any construction compatible with the present invention without involving departure from the scope of said invention as defined in the claims appended, though I prefer that it be of the construction set forth in detail in my contemporary application filed February 7, 1908, Serial Number 414,722. When rotated as stated the wheel 1 serves to drive the pump, hereinafter described, and to deliver water to the same, and the said delivery is advantageous inasmuch as it leaves the pump free to serve the sole purpose of forcing the water to a point of use or to an elevated storage receptacle or the like. Fixed to and arranged to revolve with the said wheel 1 is an interiorly-toothed annular gear 3, and with said annular gear is intermeshed an intermediate spur gear 4, which, in turn, is intermeshed with a spur gear 5 for a purpose presently set forth.

6 is the inner section of a pump casing forming part of my present invention. The said casing section 6 is made up of an annular portion the inner side of which is concave in transverse section and a side wall the exposed face of which is concave, Figs. 2 and 7, and is provided with a central opening 7, and a rib 8 surrounding the same. In addition to the section 6, which has an induction orifice connected with the conduit 2, and an eduction orifice connected with a conduit 8, Figs. 1, 3 and 4, the casing of my novel pump comprises a head 9 connected to one side of said section 6 and having a seat 10 in the center of its inner side opposed to a similar seat 11 in the side of the section 6, and a partition 12 fixed in the space between the sections 6 and 9 and above the seats 10 and 11 and having its lower edge concaved in conformity to said seats as shown.

13 is the piston of the pump which is arranged to oscillate in the described casing. The said piston is provided with a radial slot 14 to receive the partition wall 12, and surrounds and is fixed upon a ball 15 which is snugly fitted in the seats 10 and 11 of the casing, and is provided with an arm 16 terminating in a ball or globular enlargement 17.

Fixed to the before mentioned spur gear 5 is a shaft 18, journaled in a suitable fixed bearing 19, and on the said shaft 18 is feathered or otherwise fixed a crank disk 20 having a socket 21 receiving the ball or globular enlargement 17 on the piston arm 16 and also having a circular groove $8^b$ receiving the rib 8 of the casing section 6. The provision of said rib 8 and groove $8^b$ is advantageous inasmuch as by the same the joint between the casing section and the crank disk is broken and leakage from the pump casing is reduced to a minimum.

By virtue of the construction described, it will be manifest that when the wheel 1 is rotated and the conduit 2 is supplied with water by said wheel, and the ball and socket joint described is caused by the driving connection between the wheel 1 and the crank disk 20 to travel in a circle about the center of the shaft 18, the piston 13 will be oscillated and consequently water will be drawn into the pump casing at one side of the partition wall 12 and discharged from said casing at the opposite side of said wall. In this way water may be forced through the conduit 8 which is preferably, though not necessarily provided with a universal joint 8ª to the desired point of use.

As will be understood from the foregoing my invention utilizes the power of a stream to raise water from the stream and to force such water to a point of use, and hence it follows that my novel apparatus is calculated to serve as an important factor in irrigation and analogous systems.

As before stated, the construction herein illustrated and described is the most practical embodiment of my invention of which I am possessed, but I would have it understood that in the future practice of the invention various changes may be made in the form, construction and relative arrangement of parts without departing from the scope of my invention as defined in the claims appended.

Having described my invention, what I claim and desire to secure by Letters Patent, is:—

1. In an apparatus for effecting the transfer of water from one point to another, the combination of a wheel arranged to derive motion from a running stream and to raise water from such stream, and a pump arranged to derive motion from said wheel and having an induction orifice connected with and adapted to receive water from the wheel and an eduction orifice from which leads a conduit to a suitable point of discharge.

2. In an apparatus for effecting the transfer of water from one point to another, the combination of a wheel arranged to derive motion from a running stream and to raise water from such stream, a pump having an oscillatory piston and also having an induction orifice connected with and adapted to receive water from the wheel and an eduction orifice from which leads a conduit to a suitable point of discharge, and a driving connection intermediate the wheel and the pump piston arranged to convert the rotary motion of the former into the oscillatory motion necessary to the actuation of the latter.

3. In an apparatus for effecting the transfer of water from one point to another, the combination of a wheel arranged to derive motion from a running stream and to raise water from such stream and having a water conduit, a pump comprising a casing, a partition therein, and an oscillatory piston straddling the partition and having a central globular portion bearing in the casing and having an arm terminating in a ball or globular enlargement, a crank disk having a socket off its center receiving said ball or globular enlargement, a driving connection intermediate the wheel and said crank disk, a conduit between the water conduit of the wheel and the pump casing at a point at one side of the partition therein, and an eduction conduit leading from the pump casing at the opposite side of said partition.

4. In an apparatus for effecting the transfer of water from one point to another, the combination of a wheel arranged to derive motion from any motive power and to raise water from a body thereof, and a pump arranged to derive motion from said wheel and having an induction orifice connected with and adapted to receive water from the wheel and an eduction orifice from which leads a conduit to a suitable point of discharge.

In testimony whereof I affix my signature in presence of two witnesses.

EDWARD R. CONVERSE.

Witnesses:
A. L. HOUGH,
WILLIAM W. DEANE.